Dec. 27, 1938.  V. H. HURT  2,141,788
MANUFACTURE OF RUBBER ARTICLES

Filed Jan. 4, 1935

VULCANIZABLE LATEX

↓ DEPOSIT ON FORM

RUBBER LAYER

↓ REMOVE FROM FORM
AND TUMBLE
CURE IN AIR
STEAM OR WATER

VULCANIZED RUBBER ARTICLE

INVENTOR.
VICTOR H. HURT
BY Gourley & Budlong
ATTORNEYS

Patented Dec. 27, 1938

2,141,788

UNITED STATES PATENT OFFICE 2,141,788

MANUFACTURE OF RUBBER ARTICLES

Victor H. Hurt, Naugatuck, Conn., assignor to United States Rubber Company, New York, N. Y., a corporation of New Jersey Application January 4, 1935, Serial No. 427

8 Claims. (Cl. 18—53)

This invention relates to the manufacture of rubber articles and more particularly to the manufacture of rubber articles by depositing rubber directly from aqueous dispersions of rubber such as latex on to deposition backings by dipping, spraying, spreading and like operations.

In the manufacture of rubber articles by deposition of rubber films from latex on deposition backings, it has been common practice to utilize forms of metal, clay, porcelain, wood, glass, paper, hard rubber and soft vulcanized rubber, the latter preferably being treated as with sulphur chloride and bromine to produce a rubber deposition surface from which a film deposited from latex may be easily removed. In the preparation of small thin articles, it is the practice to use a vulcanizable latex containing a low temperature accelerator and at least partially vulcanize the rubber deposit on the form by curing in hot water, thereafter stripping the article from the form, treating with soapstone or like material to dry the same, and if necessary completing the cure by allowing the articles to age for several days before use. In the manufacture of relatively large and relatively thick articles such as bathing caps, gloves, sheet material and the like, it is customary to utilize a vulcanizable latex and to remove the rubber film from the deposition backing after drying. If the product is to be utilized in the shape in which it is removed from the deposition backing, the article is preferably vulcanized on the backing in order to prevent subsequent deformation on handling in the unvulcanized condition. In the case of engraved or otherwise marked forms or backings where the article is turned inside out prior to vulcanizing in order to transfer the marking on the surface of the form to the article, the article such as a cap or the like, is removed from the form, turned inside out, and transferred to another form or returned to the same form for vulcanizing in the desired final shape. Vulcanization of the articles on forms whether on the deposition form or on a form to which the deposited article has been transferred, especially in the case of forms where the deposition surface is made of rubber, oftentimes produces undue adhesion to the surface and subsequent tearing of the articles on removal from the form surfaces.

The present invention relates to improved methods of vulcanizing articles deposited directly from vulcanizable latices on deposition backings.

According to the present invention, rubber films are deposited from vulcanizable latex on deposition backings, as by spreading, spraying or dipping operations, and the articles, preferably after partial or complete drying, are removed from the backings before vulcanization or before completion of the vulcanization, and tumble cured in a non-halogen containing medium. It has been found that such articles deposited directly from aqueous dispersions of rubber, such as latex, may be tumble cured in a non-halogen containing medium such as air, steam or water without any permanent deformation of the same. By the present invention, a deposit of the solids of a vulcanizable latex of any thickness may be stripped from the form and subsequently tumble cured in a non-halogen containing medium. It has been known to tumble cure calendered and cement dipped rubber articles in a halogen containing medium, such as sulphur chloride for example, but such a surface cure is only available in the vulcanization of extremely thin articles. With sulphur chloride, the vulcanization takes place with such rapidity that the article is not subjected to such stresses and strains in the tumbling operation while still in an unvulcanized condition as would produce a deformation which would remain in the vulcanized product. Curing a vulcanizable rubber compound in a non-halogen containing medium is a much slower process than curing in sulphur chloride, and when a calendered or cement dipped rubber article is to be cured in a non-halogen containing medium such as air, steam or water, it must be vulcanized in its final shape as on a form or in the flat, since it is known that calendered and cement dipped rubber articles have not sufficient resistance to deformation when subjected to tumbling stresses and strains while in an unvulcanized condition to prevent a permanent wrinkling or creasing of the product after vulcanization by a tumble curing process. Tumble curing of vulcanizable calendered or cement dipped rubber articles in a non-halogen containing medium such as air, steam or water has been impossible since such articles after tumble curing in a non-halogen containing medium would become permanently set in a distorted condition due to the failure of the type of rubber itself to maintain the desired shape under severe tumbling conditions until vulcanization takes place. I have found, however, that rubber articles made directly from latex, unlike calendered and cement dipped rubber articles, have sufficient resistance to deformation when subjected to the stresses and strains incident to tumbling operations when in an unvulcanized or partially vulcanized condition to permit the slower and of course more desirable vulcanization in a non-halogen containing medium, such as air, steam or water, to be carried out by tumbling methods, and thus obviate the difficulties incident to maintaining the final shape of the article during the curing operation as is essential in curing of calendered and cement dipped rubber articles in a non-halogen containing medium.

In the case of articles deposited directly from latex on deposition backings having surface markings, such as bathing caps deposited on engraved or marked forms, the articles may be removed from the forms and turned inside out prior to tumble curing, whereupon the articles will be permanently set without distortion after curing in the proper shape. With ultra accelerators in the latex compound, some slight vulcanization may take place on the form, but such is not essential to maintaining the articles in their proper shape throughout the tumble curing operation. The tumble curing operation need not entirely complete the vulcanization of the articles, since it may be desirable, because of time considerations to allow the articles to age after tumble curing. The drawing shows the essential steps of the applicant's process; namely, depositing a "vulcanizable latex" on a form (step illustrated at top arrow) to produce a "rubber layer" which is removed from the form and tumble cured in steam, air or water (step illustrated at bottom arrow) to form the "vulcanized rubber article".

The term "latex" in the description and claims is intended to designate broadly coagulable dispersions of elastic materials including artificial dispersions of rubber or rubber-like materials as well as natural latex which may be preserved or compounded or otherwise treated as desired and which may not be a normal, diluted, concentrated or purified condition produced by methods well known in the art.

In view of the many changes and modifications that may be made without departing from the principles underlying the invention, reference should be made to the appended claims for an understanding of the scope of the invention.

Having thus described my invention, what I claim and desire to protect by Letters Patent is:

1. In the manufacture of rubber articles by the deposition of rubber films from vulcanizable latex on deposition backings, the steps which comprise removing the rubber films from the surface of the deposition backings at least before complete vulcanization, and substantially increasing the state of vulcanization thereof by tumble curing said articles under vulcanizing conditions in a medium selected from the group consisting of air, steam and water.

2. In the manufacture of rubber articles by the deposition of rubber films from vulcanizable latex on deposition backings, the steps which comprise removing the rubber films from the surface of the deposition backings before any substantial vulcanization, and substantially increasing the state of vulcanization thereof by tumble curing said articles under vulcanizing conditions in a medium selected from the group consisting of air, steam and water.

3. In the manufacture of rubber articles by the deposition of rubber films from vulcanizable latex on deposition backings having rubber deposition surfaces, the steps which comprise removing the rubber films from the surface of the deposition backings at least before complete vulcanization, and substantially increasing the state of vulcanization thereof by tumble curing said articles under vulcanizing conditions in a medium selected from the group consisting of air, steam and water.

4. In the manufacture of rubber articles by the deposition of rubber films from vulcanizable latex on deposition backings, having rubber deposition surfaces, the steps which comprise removing the rubber films from the surface of the deposition backings before any substantial vulcanization, and substantially increasing the state of vulcanization thereof by tumble curing said articles under vulcanizing conditions in a medium selected from the group consisting of air, steam and water.

5. In the manufacture of rubber articles with surface markings by the deposition of rubber films from vulcanizable latex on deposition backings having marked deposition surfaces, the steps which comprise removing the rubber films from the surface of the deposition backing and turning them inside out at least before complete vulcanization, and substantially increasing the state of vulcanization thereof by tumble curing said articles under vulcanizing conditions in a medium selected from the group consisting of air, steam and water.

6. In the manufacture of rubber articles with surface markings by the deposition of rubber films from vulcanizable latex on deposition backings having marked deposition surfaces, the steps which comprise removing the rubber films from the surface of the deposition backing and turning them inside out before any substantial vulcanization, and substantially increasing the state of vulcanization thereof by tumble curing said articles under vulcanizing conditions in a medium selected from the group consisting of air, steam and water.

7. In the manufacture of rubber articles with surface markings by the deposition of rubber films from vulcanizable latex on deposition backings having marked rubber deposition surfaces, the steps which comprise removing the rubber film from the surface of the deposition backing and turning them inside out at least before complete vulcanization, and substantially increasing the state of vulcanization thereof by tumble curing said articles under vulcanizing conditions in a medium selected from the group consisting of air, steam and water.

8. In the manufacture of rubber articles with surface markings by the deposition of rubber films from vulcanizable latex on deposition backings having marked rubber deposition surfaces, the steps which comprise removing the rubber films from the surface of the deposition backing and turning them inside out before any substantial vulcanization, and substantially increasing the state of vulcanization thereof by tumble curing said articles under vulcanizing conditions in a medium selected from the group consisting of air, steam and water.

VICTOR H. HURT.